United States Patent [19]
Pittasch

[11] 3,916,481
[45] Nov. 4, 1975

[54] FURNITURE HINGE

[75] Inventor: Willi Pittasch, Herford, Germany

[73] Assignee: Firma Richard Heinze GmbH & Co. KG, Herford, Germany

[22] Filed: Jan. 3, 1975

[21] Appl. No.: 538,279

[30] Foreign Application Priority Data
Jan. 21, 1974 Germany............................ 2402667

[52] U.S. Cl..................................... 16/166; 16/179
[51] Int. Cl.².... E05D 3/06; E05D 3/08; E05D 3/10; E05D 15/52
[58] Field of Search.......... 16/128 R, 176, 144, 162, 16/163, 164, 166, 168, 169, 179, 173, 183; 312/296

[56] References Cited
UNITED STATES PATENTS

| | | | |
|---|---|---|---|
| 1,998,319 | 4/1935 | Johnson............................ | 16/179 X |
| 2,793,387 | 5/1957 | Odell................................... | 16/166 |
| 2,959,808 | 11/1960 | Limberg............................. | 16/179 |
| 2,975,013 | 3/1961 | Wallace et al..................... | 16/179 X |
| 3,682,348 | 8/1972 | Roberts............................. | 16/166 X |

Primary Examiner—Geo. V. Larkin
Attorney, Agent, or Firm—Elliott I. Pollock

[57] ABSTRACT

A furniture hinge for mounting a furniture door on a furniture body member includes a hinge bracket which is attached to either the door or body member and which includes a flat flange defining an elongated interior slot having spaced teeth forming a rack. A cooperating tooth wheel is nonrotatably attached to the other furniture member, either by means of a striking pin which is driven into a bore hole in the other member or by means of a housing which supports the tooth wheel and which is inserted into the other member, and the tooth wheel meshes with the rack teeth to cause the tooth wheel to run along the rack as the two furniture members are angularly displaced about a pivot axis defined by the axis of the tooth wheel. The crown diameter of the tooth wheel is substantially equal to the width of the bracket slot, and the tooth wheel also includes an outstanding shoulder which has a diameter greater than the width of the slot and which bears against flat surfaces of the bracket flange to inhibit axial movement of the tooth wheel relative to the flange and to guide its movement as it runs along the slot. Various arrangements are disclosed for mounting flush doors as well as superposed doors on a piece of furniture.

12 Claims, 14 Drawing Figures

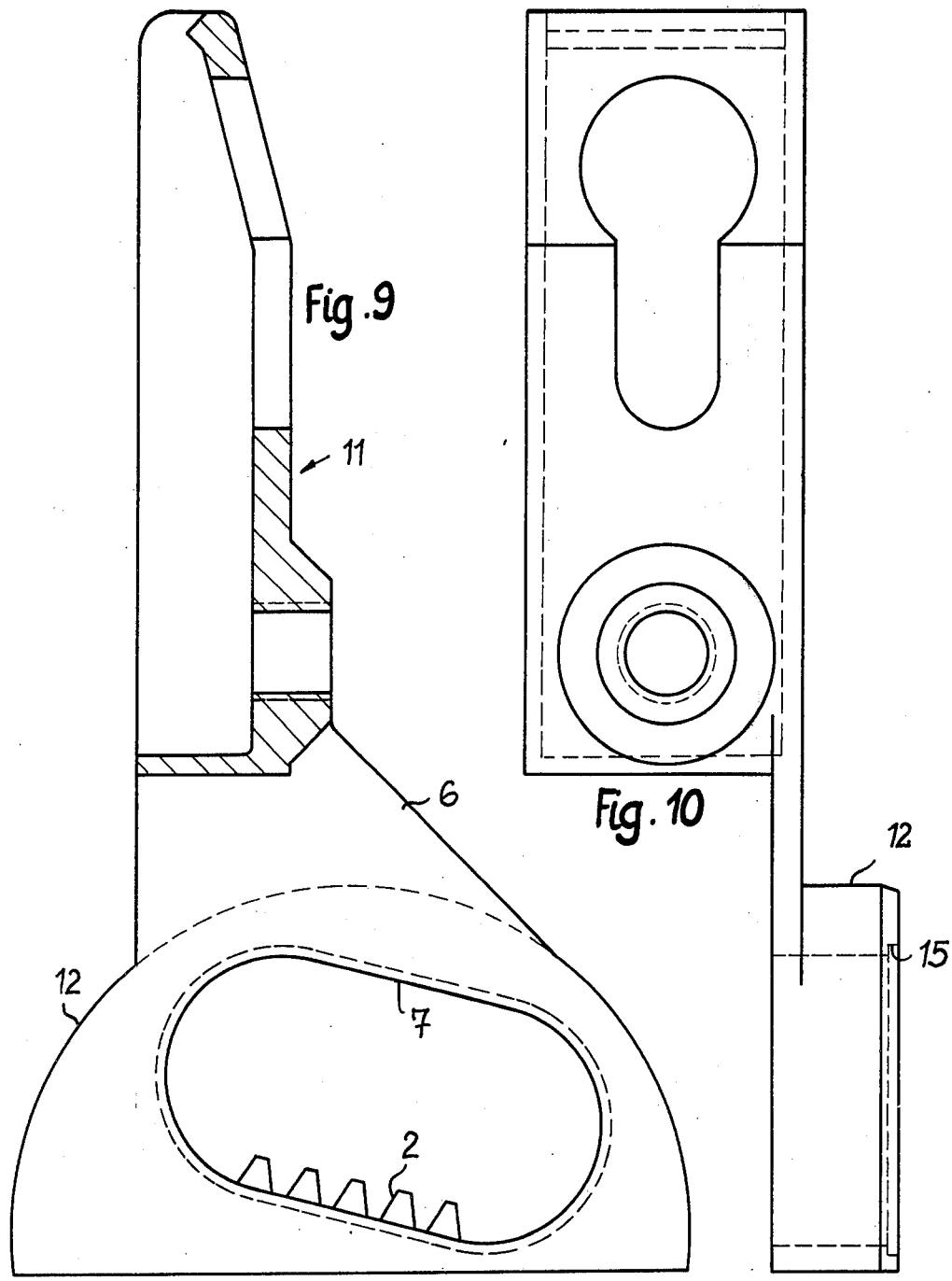

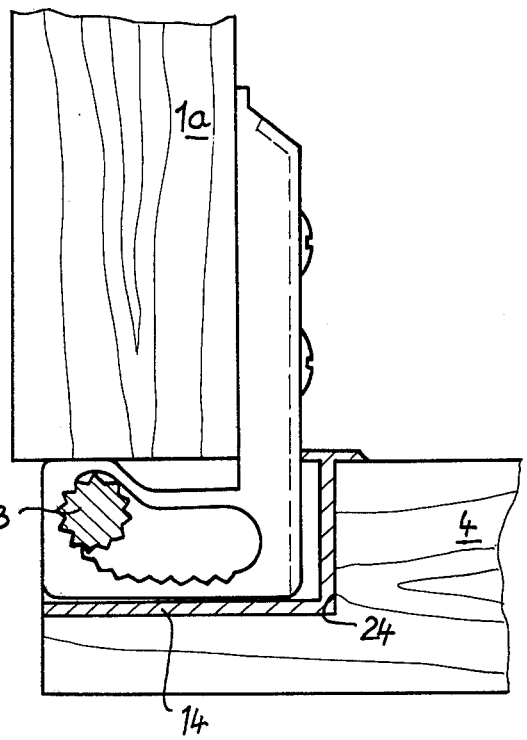
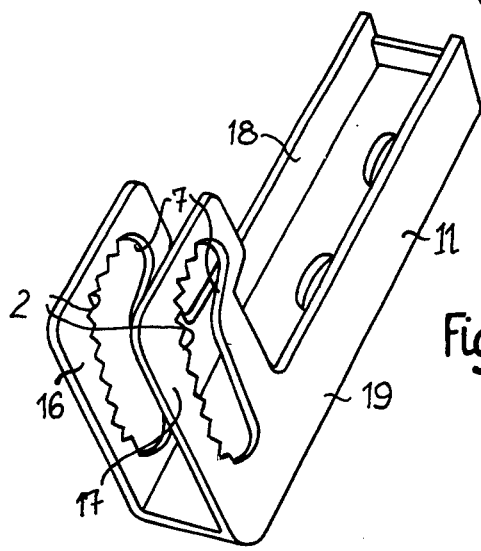
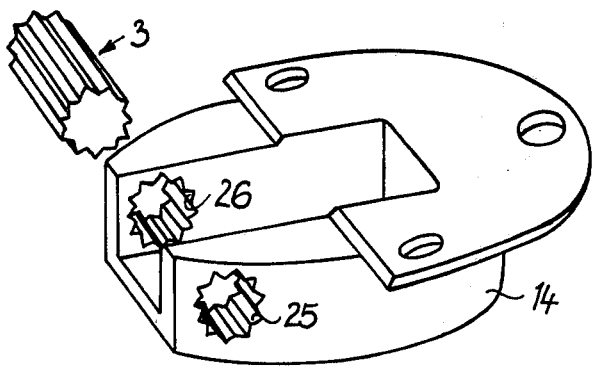

FURNITURE HINGE

BACKGROUND AND SUMMARY OF THE INVENTION

The present invention relates to an improved furniture hinge of the type having an element which can be attached to the body of a piece of furniture for coopertion with a further element which can be attached to the furniture door. Furniture hinges of this general type, suggested heretofore, have consisted of a cyylindrical housing member which is inserted into a borehold in the furniture door, for cooperation with a hinge bracket and with an adjustment plate which is firmly screwed onto the body of the furniture piece and also screwed firmly onto the hinge bracket. Such furniture hinges have operated satisfactorily in practice and have been built into numerous furniture items in large numbers. They have suffered from the disadvantage, however, that they are relatively expensive because they are made up of numerous individual parts.

One purpose of the present invention, therefore, is to provide a furniture hinge structure which is made up of as few individual parts as possible.

According to the invention, the furniture hinge is simplified by providing a first hinge element which can be attached to the body of the furniture piece and which defines a rack portion comprising fixed teeth along which runs a tooth wheel that is attached to the furniture door or, conversely, the toothed rack may be attached to the furniture door with the tooth wheel being attached to the furniture body. Hinges of this general gear-and-rack type have been suggested heretofore for use in other environments, e.g. see Johnson U.S. Pat. No. 1,998,319 and Wallace et al. U.S. Pat. No. 2,975,013, but, by reason of their particular configuration, these prior art structures have not been adapted for use on furniture. A further object of the invention, therefore, is to provide hinge constructions of the gear and rack type which can be employed in a furniture environment.

A furniture hinge, built according to the present invention, need not constitute more than two parts, i.e. a tooth wheel which, in the most important practical form of this invention, is hammered into the furniture door by means of an integral striking pin, and a rack-defining flange which is firmly screwed onto the body of the furniture piece.

The flange extends parallel to that front edge of the furniture door in which the tooth wheel is positioned, with the rack teeth being provided along one side of a longitudinal slot in the flange.

To provide proper guidance of the door, the width of the longitudinal slot corresponds substantially to the crown circle diameter of the tooth wheel so that the tooth wheel is fixed laterally in the longitudinal slot no matter what the swing position of the door is. Moreover the tooth wheel is preferably provided with a circular shoulder whose diameter is larger than the width of the longitudinal hole, said shoulder being disposed adjacent the teeth of the tooth wheel and bearing on an untoothed portion of the flange adjacent the aforementioned rack teeth to restrict relative displacement of said tooth wheel and flange in the axial direction of said tooth wheel.

The shoulder may run along a recessed guide surface in the flange. In practice, for reasons of wear and tear, it is preferred that the shoulder provide the primary guidance function, instead of having this accomplished exclusively by the tooth wheel together with the toothed slot in which it runs.

In one preferred embodiment of the invention, an adjustment plate is also provided, and a hinge bracket having a U-shaped cross-section and carrying the rack-defining flange portion of the hinge is disposed in overlapping relation to the adjustment plate and screwed thereto. Such a design facilitates adjustment of the furniture door, after installation of the hinges, in a particularly simple fashion.

In another embodiment, the flange includes an outstanding pot-like thickened portion which can be inserted into a complementarily shaped borehold in the body of the furniture and which has the aforementioned longitudinal toothed slot therein opening into the flange. The thickened portion permits the width of the teeth in the rack and/or on the tooth wheel to be significantly increased with the consequence that the surface pressure between the flanks of the tooth wheel and the flanks of the rack teeth can be kept small.

In still another embodiment, the tooth wheel is attached to or mounted within a housing adapted to be inserted into a complementary region of the furniture door. In one version of this embodiment the housing includes an interior recess, and the tooth wheel extends across the housing recess for cooperation with a rack-defining hinge bracket which is attached to the furniture piece. In this version the hinge bracket preferably includes parallel flanges, constituting prolongations of side shanks of the bracket, with at least one flange having rack teeth therein or thereon, the spacing between the flanges and the flange dimensions being so selected that, when the furniture door is closed the flanges are completely received by and concealed within the housing recess.

BRIEF DESCRIPTION OF THE DRAWINGS

The preferred versions of the invention will now be described in detail by reference to the accompanying drawings, in which:

FIG. 9 is a partial cutaway top view of a hinge bracket for use with flush doors, constructed in accordance with another embodiment of the invention to provide a thickened portion and wider rack teeth, for insertion into a complementary bore-hole in the furniture piece;

FIG. 10 is a side view of the hinge bracket shown in FIG. 9;

FIG. 11 depicts another version of the furniture hinge constructed in accordance with the present invention for use with a superposed or non-flush door;

FIG. 12 illustrates the hinge bracket of the furniture hinge shown in FIG. 11;

FIG. 13 is an exploded view of a housing and its associated tooth wheel for cooperation with the bracket of FIG. 12 to provide the furniture hinge of FIG. 11.

DESCRIPTION OF THE PREFERRED EMBODIMENTS

Figure 1:
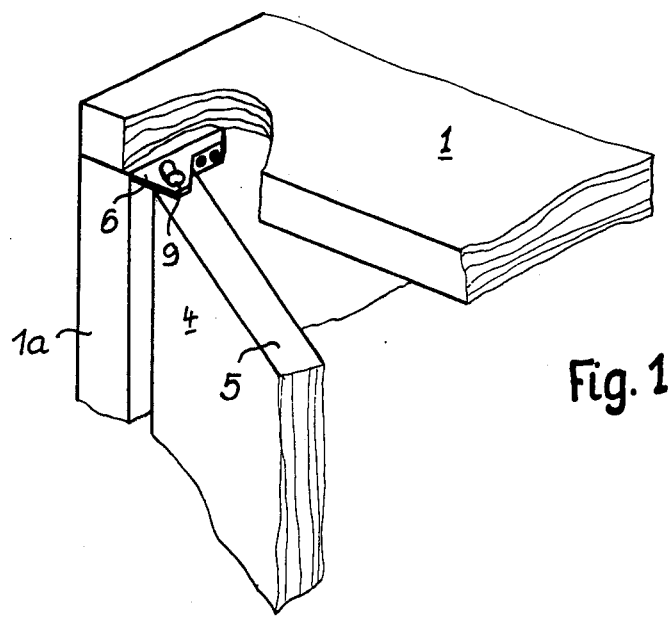
FIG. 1 is a perspective, schematic view of a hinge positioned adjacent the left upper edge of a piece of furniture, and constructed in accordance with the present invention for use with a flush door.
Figure 2:
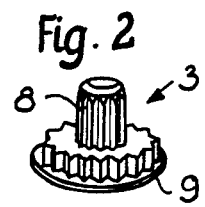
FIG. 2 is a perspective view of the tooth wheel used in the flush door arrangement of FIG. 1.
Figure 3:
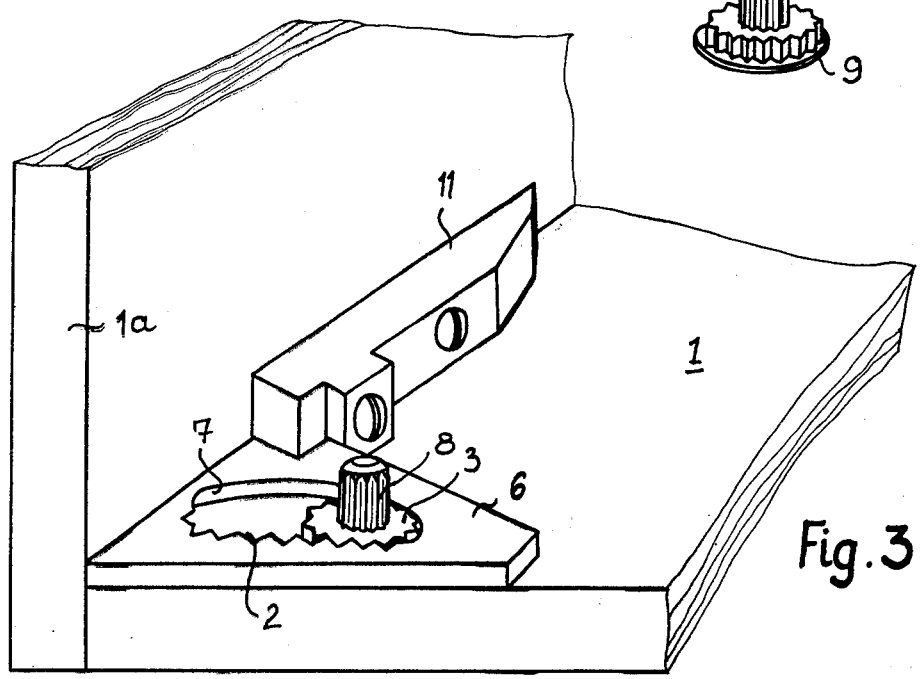
FIG. 3 illustrates the details of one embodiment of the flush door hinge, the door not being illustrated.
Figure 4:
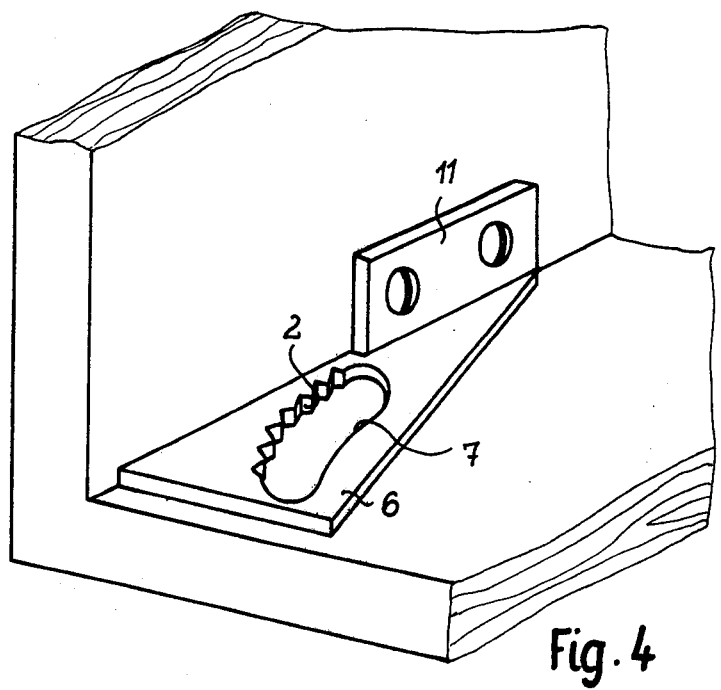
FIGS. 4 and 5 illustrate, respectively, variants of the rack-defining flange portions of the hinge, firmly attached to the body of the furniture piece, for use with flush doors.
Figure 5:
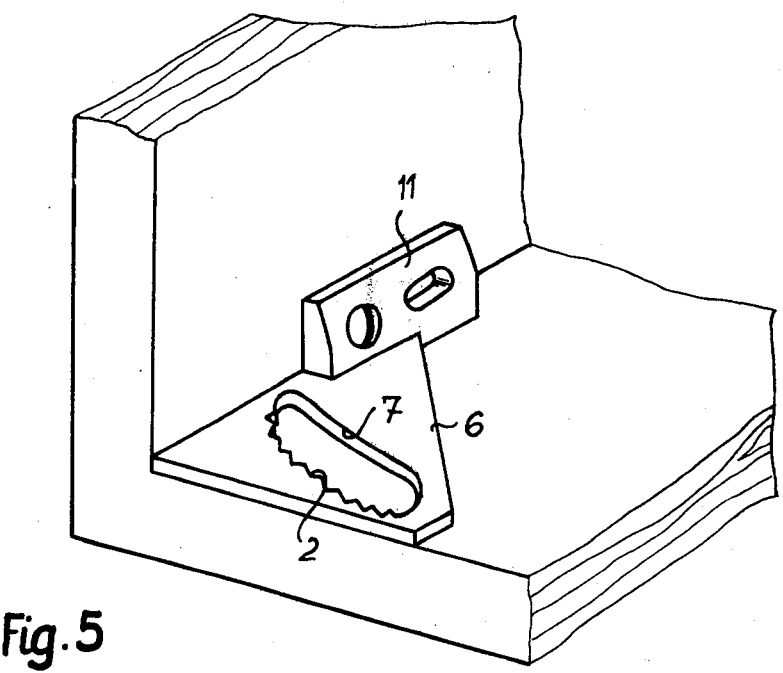

Referring initially to the flush-door embodiments of the present invention shown in FIGS. 1–8, the flush door 4 is hinged to the body 1 of a piece of furniture by means of an upper and a lower hinge. The upper hinge is indicated schematically in FIG. 1; and the lower hinge is illustrated in detail in FIG. 3. Each hinge has a hinge bracket 11 which is screwed onto the interior side wall 1a of the furniture body 1. the hinge bracket 11 merges into an integral flange 6 which defines a longitudinal slot 7 having rack teeth 2 along one longitudinal edge. Flange 6 is disposed within the furniture piece, overlies an interior surface of the piece, and extends along the front edge of the piece parallel to the door when the door is closed. The bracket, its flange, and the slot configuration and orientation, may take various forms as shown in FIGS. 3, 4, and 5.

Figure 7:
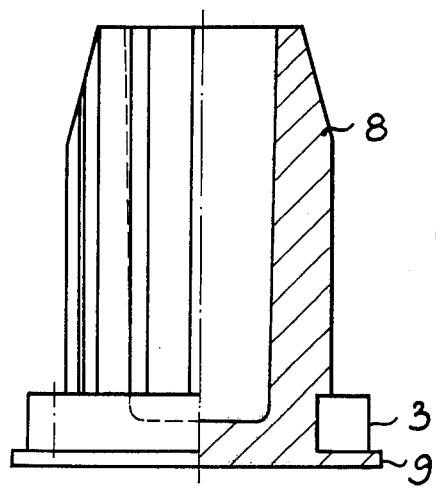
FIG. 7 is a partial cross-section of the tooth wheel shown in FIG. 2.
Figure 8:
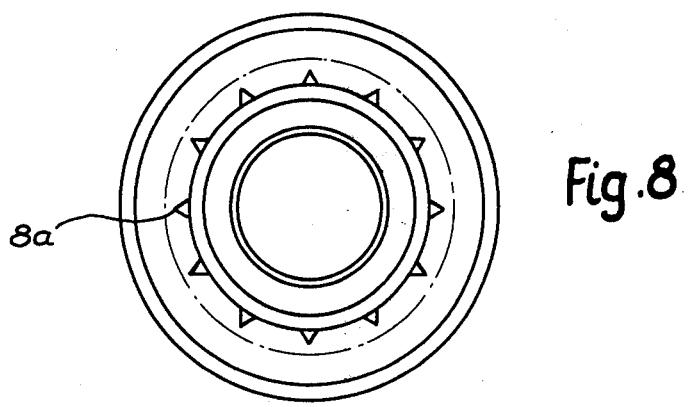
FIG. 8 is a top view of the tooth wheel of FIG. 7.
Figure 14:
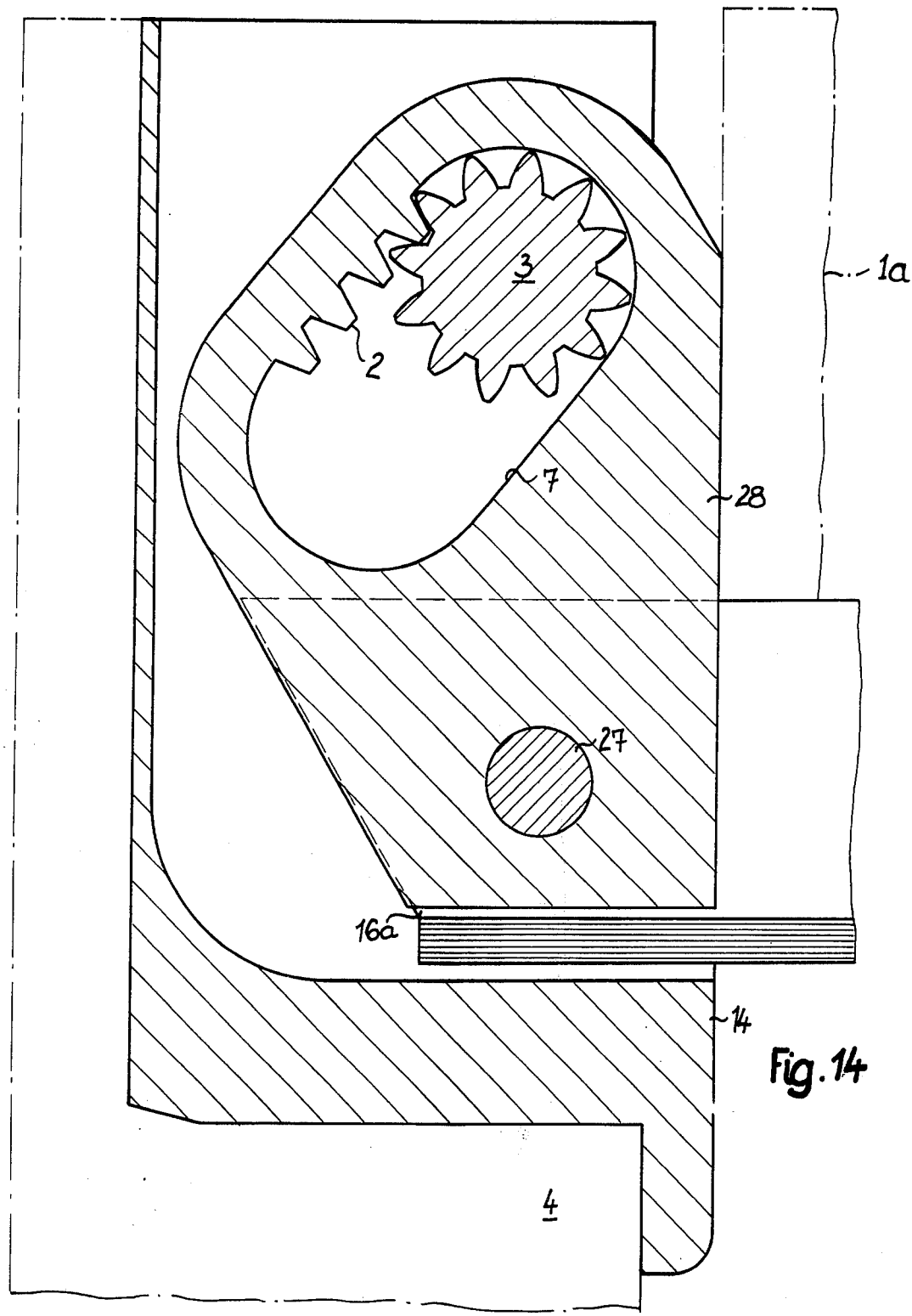
FIG. 14 is a cross-section through another embodiment of a furniture hinge having a structure similar to that of FIG. 11.

Rack teeth 2 cooperate with a tooth wheel 3 which has an integral, axial striking pin 8 as well as a larger diameter, circular guiding shoulder 9 (see FIGS. 2 and 7). The striking pin 8 is provided to fix the tooth wheel 3 in a non-rotatable manner in a bore hole in furniture door 4 which extends into the door edge in the direction of the swing axis and which is located on the edge 5 of furniture door 4 at a position opposite the flange 6. The bore hole is so dimensioned that the striking pin 8 cannot turn in the bore hole, and the striking pin 8 is preferably provided with longitudinal ribs 8a (see FIG. 8) to assure such turn-proof fastending in the door edge. When the door 4 is swung about its swing axis, tooth wheel 3 runs along teeth 2.

Figure 6:
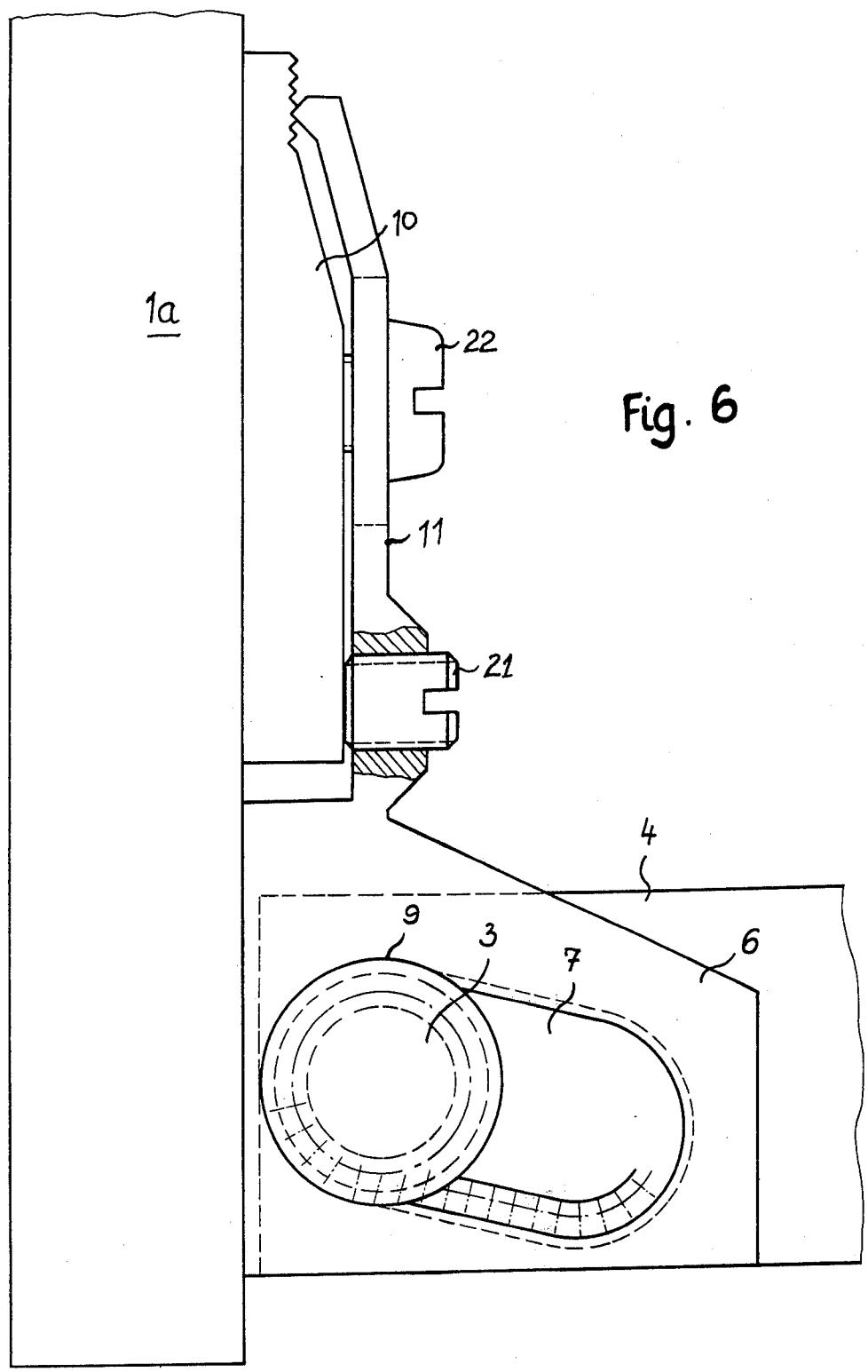
FIG. 6 is a top view of an adjustable hinge constructed in accordance with the present invention for flush doors.

In the version according to FIG. 6, the basic structure is the same except that the hinge bracket 11 has a U-shaped cross-section adapted to overlie an adjusting plate 10. The spacing between hinge bracket 11 and plate 10 is adjusted by means of an adjusting screw 21 which bears on the adjusting plate 10, and bracket 11 is then fixed in its adjusted position by means of an attachment screw 22 which is threaded into the adjusting plate 10. The adjusting plate 10, in turn, is directly screwed onto the sidewall 1a of the furniture body.

In each of the embodiments illustrated, the width of the longitudinal slot 7 is slightly greater than or roughly the same as the crown circle diameter of the tooth wheel 3, but is less than the diameter of guiding shoulder 9. As a result, the tooth wheel 3, after assembly in the swing axis direction, is fixedly held within flange 6 with shoulder 9 riding along a portion of the flange adjacent the longitudinal edges of slot 7 (see especially FIG. 6).

In the flush door version of FIG. 9–11, the basic structure of the hinge bracket 11 is similar. However, in this form of the invention flange 6 includes, on its underside an integral, pot-like thickened portion 12 which can be inserted into a corresponding bore hold in the furniture body. The longitudinal hole 7, on its inferior edge, is bounded by a recessed groove which provides a guidance surface 15 for the shoulder 9 of tooth wheel 3.

In the versions of the invention shown in FIGS. 11–14 which are used for protruding doors, the tooth wheel 3 is located within a housing 14. Housing 14 (see FIG. 13) includes a pair of spaced side members defining a recess therebetween, and the side members are provided respectively with two tapering apertures 25 and 26 which, in terms of their shape and size, correspond to the shape and size of tooth wheel 3. During assembly, tooth wheel 3 is inserted into penetrations 25 and 26 so as to extend across the housing recess, and housing 14 is then inserted into a bore hole 24 in the door (see FIG. 11).

The cooperating hinge bracket 11, which is attached by screws to the interior of the furniture piece (FIG. 11), is U-shaped in cross-section and has two flanges 16 and 17 which form the prolongation of the lateral shanks 18, 19 of the U-shaped profile of hinge bracket 11. Flanges 16 and 17 are positioned to the exterior of the furniture piece when the bracket 11 is mounted in place, and are spaced and dimensioned for reception into the recess in housing 14 as best shown in FIG. 11. Flanges 16 and 17 each have interior slots which define two sets of rack teeth 2 along which the tooth wheel 3 runs.

Instead of providing the rack teeth in flanges 16 and 17, the flanges 16 and 17 may be provided with longitudinal holes having no teeth and, between the two longitudinal holes there can be provided a synthetic or plastic part having a longitudinal hole and a toothed area. One such design is illustrated, for example, in FIG. 14. In this version, flange 16a is not bent but rather is shortened. Between this flange and a (not visible) corresponding upper flange there is attached, by means of a pin 27, a synthetic part 28 which has a longitudinal slot 7 defining rack teeth 2. The action of this hinge is identical to that illustrated in FIGS. 11–13.

The rack teeth, in the various longitudinal slots 7, may extend along a straight and/or curved line. When disposed along a curved line, or when otherwise disposed along a line extending at an angle with respect to the front wall of the furniture, it is possible, when the door is opened, to immediately lift the vertical edge of a flush door off the adjacent interior surface of the furniture side wall. Likewise, in the case of protruding doors, such a rack tooth orientation causes the rear door surface to be immediately lifted off the front surface of the furniture side wall. The choice of the curvature or the angular position of the rack teeth orientation with respect to the furniture front wall depends on the desired opening characteristics.

I claim:

1. A furniture hinge for mounting a furniture door member on a furniture body member comprising a hinge bracket adapted to be attached to one of said members, said bracket including a flat flange defining an elongated, interior slot having spaced teeth extending into said slot from one interior edge of said slot to form a rack, a tooth wheel adapted to be attached to the other of said members for insertion into said flange slot, said tooth wheel having spaced teeth extending outwardly of and completely around said wheel for meshing engagement with said rack teeth to cause the tooth wheel to run along said elongated slot as said members are angularly displaced relative to one another about a pivot axis defined by the axis of said tooth wheel, the crown diameter of said tooth wheel being substantially equal in dimension to the width of said slot to maintain said teeth in meshing engagement with one another and to inhibit lateral movement of said tooth wheel relative to said slot, and said tooth wheel including an outstanding shoulder having a diameter greater than the width of said slot, said shoulder being positioned to bear against flat surfaces of said flange bounding the edges of said slot to inhibit relative axial movement between said tooth wheel and flange and to guide said tooth wheel as it runs along said slot.

2. The hinge of claim 1 wherein said bracket is attached to said furniture body member, said bracket including an elongated attachment portion for securing said bracket to an interior vertical side wall of said body member, said flange being integral with said attachment portion and extending at substantially right angles thereto for disposition in a direction substantially parallel to the front of said body member.

3. The hinge of claim 2 wherein said flange overlies an interior horizontal surface of said furniture body member for cooperation with a flush door having said tooth wheel attached to an edge thereof.

4. The hinge of claim 2 wherein said flange is located exterior of said furniture body member for cooperation with a protruding door having said tooth wheel attached to an edge thereof.

5. The hinge of claim 4 wherein said tooth wheel is mounted in a housing having a pair of spaced interior side walls defining a recess therebetween, said tooth wheel being affixed at its opposing ends to said housing side walls and extending across said recess, the portions of said interior side walls adjacent said tooth wheel constituting said shoulder.

6. The hinge of claim 5 wherein said bracket includes a pair of spaced substantially parallel flanges each of which has an elongated interior slot therein, the spacing between said pair of flanges and the dimensions of said flanges being no greater than the dimensions of said recess to permit said flanges to be received in said recess and concealed by said housing when said door member is in its closed position.

7. The hinge of claim 6 wherein at least one of said slots is toothed along one edge thereof to form said rack.

8. The hinge of claim 6 wherein said bracket includes a bridging member extending between and supported by said flanges, said bridging member having a toothed slot therein constituting said rack.

9. The hinge of claim 2 including an adjustment plate secured to the interior vertical side wall of said body member, said attachment portion of said bracket being attached to said adjustment plate and having a U-shaped cross section dimensioned to overlie said adjustment plate, and means for selectively varying the spacing between said attachment portion and said adjustment plate.

10. The hinge of claim 2 wherein said flange includes an outwardly protruding thickened portion for insertion into a bore hole in said body member, said interior slot and its associated teeth extending through substantially the entire depth of said thickened portion.

11. The hinge of claim 2 wherein said tooth wheel includes a gear portion having an integral striking pin extending along the axis thereof from one face of said gear portion for insertion into a bore hole in an edge of said door member, said shoulder comprising a circular untoothed portion of said tooth wheel having a diameter greater than the crown diameter of said gear portion and located closely adjacent the other face of said gear portion.

12. The hinge of claim 11 wherein one face of said flange includes a recessed groove extending around the edges of said slot to define a guide surface along which the circular shoulder of said tooth wheel runs.

* * * * *